US006946749B2

(12) United States Patent
Turner

(10) Patent No.: US 6,946,749 B2
(45) Date of Patent: Sep. 20, 2005

(54) AUTOMATIC MANAGEMENT OF THE HEALTH OF AN ELECTRICAL STORAGE DEVICE

(75) Inventor: Christopher David Glenn Turner, Erie, IL (US)

(73) Assignee: Deere & Company, Moline, IL (US)

( * ) Notice: Subject to any disclaimer, the term of this patent is extended or adjusted under 35 U.S.C. 154(b) by 144 days.

(21) Appl. No.: 10/696,786

(22) Filed: Oct. 30, 2003

(65) Prior Publication Data

US 2005/0093303 A1 May 5, 2005

(51) Int. Cl.[7] .............................. H02P 9/04; F02M 7/00

(52) U.S. Cl. ....................... 290/40 C; 290/40 B; 322/7; 123/350

(58) Field of Search ............................ 290/40 R, 40 B, 290/40 C; 322/7, 17; 123/350, 352

(56) References Cited

U.S. PATENT DOCUMENTS 5,038,728 A * 8/1991 Yoshida et al. ......... 123/198 R
5,080,059 A * 1/1992 Yoshida et al. ......... 123/198 R
5,402,007 A * 3/1995 Center et al. ............. 290/40 B
5,481,176 A * 1/1996 DeBiasi et al. ................ 322/7
5,652,486 A * 7/1997 Mueller et al. ............. 318/369
5,730,094 A * 3/1998 Morris .................... 123/192.1
5,732,676 A * 3/1998 Weisman et al. ........... 123/436
6,220,223 B1 * 4/2001 Weisman et al. ........... 123/436
6,396,161 B1 * 5/2002 Crecelius et al. ......... 290/36 R
6,534,958 B1 * 3/2003 Graber et al. ................. 322/11
6,573,614 B2 6/2003 Doll ......................... 290/40 C
6,830,015 B2 * 12/2004 Venturoli et al. ......... 123/41 E

* cited by examiner

*Primary Examiner*—Nicholas Ponomarenko

(57) ABSTRACT

A system and method for maintaining the health of an electrical storage device measures revolutions per unit time of an engine shaft of an internal combustion engine. A status signal is provided indicating whether the engine shaft is disengaged or engaged with a remainder of a drive train to propel a vehicle. A controller determines minimum revolutions per unit time necessary to provide at least a threshold minimum percentage of full operational output power of an alternator. The controller sends a control signal to control the revolutions per unit time of the engine shaft to be equal to or greater than the determined minimum revolutions per unit time if the status signal is indicative of disengagement. A throttle actuator associated with providing fuel to the internal combustion engine is responsive to the control signal.

16 Claims, 3 Drawing Sheets

AUTOMATIC MANAGEMENT OF THE HEALTH OF AN ELECTRICAL STORAGE DEVICE

FIELD OF THE INVENTION

This invention relates the automatic management of the health of an electrical storage device associated with a vehicle.

BACKGROUND OF THE INVENTION

Hybrid vehicles comprise an internal combustion engine associated with an electrical propulsion system. The hybrid vehicle may use an electrical storage device such as batteries to store electrical energy. During idle mode of the internal combustion engine and during electrical propulsion mode of the vehicle, the electrical load may deplete the electrical charge stored in an electrical storage device. The fuel economy of a hybrid vehicle may be degraded by premature depletion of the electrical energy stored in the electrical storage device. Thus, a need exists for minimizing depletion of the electrical energy stored in the electrical storage device.

SUMMARY OF THE INVENTION

A system and method for maintaining the health of an electrical storage device measures revolutions per unit time of an engine shaft of an internal combustion engine. A status signal is provided indicating whether the engine shaft is coupled or decoupled with at least one drive wheel to propel a vehicle. A controller determines minimum revolutions per unit time necessary to provide at least a threshold minimum percentage of full operational output power of an alternator. The controller sends a control signal to control the revolutions per unit time of the engine shaft to be equal to or greater than the determined minimum revolutions per unit time if the status signal is indicative of decoupling. A throttle actuator associated with providing fuel to the internal combustion engine is responsive to the control signal.

DESCRIPTION OF THE PREFERRED EMBODIMENT

An electrical propulsion mode refers to a mode in which a hybrid vehicle is substantially propelled or driven by an electric drive motor. An internal combustion engine may, but does not necessarily, supply electrical energy for the electric drive motor or other electrical components during operation in the electrical propulsion mode. The internal combustion mode refers to a mode in which a hybrid vehicle is substantially propelled or driven by an internal combustion engine.

Figure 1:
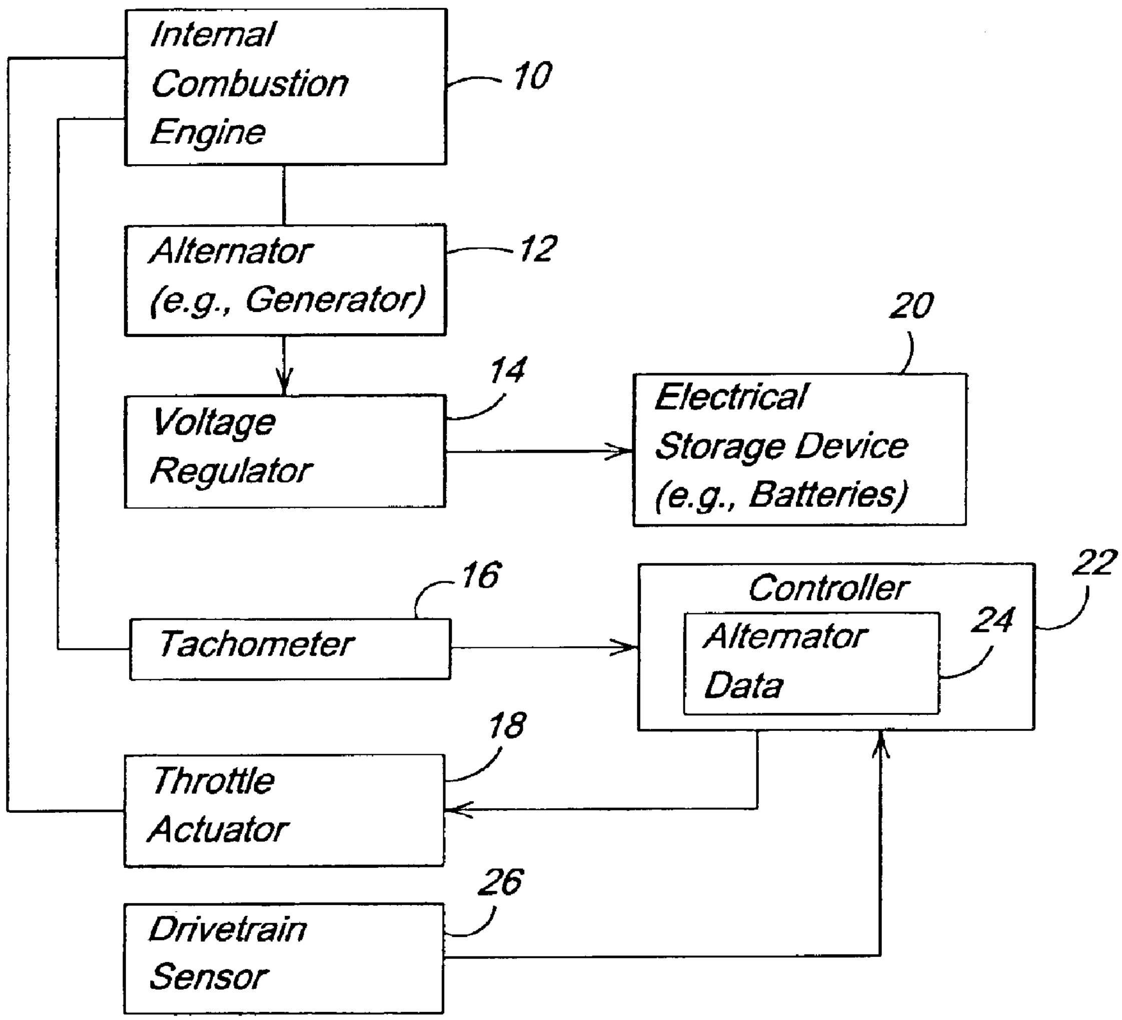
FIG. 1 is a block diagram of a management system for managing the health of an electrical storage device of a vehicle in accordance with the invention.

In FIG. 1, during operation an internal combustion engine 10 mechanically drives or provides rotational mechanical energy to an alternator 12. The alternator 12 converts mechanical energy into electrical energy. The alternator 12 may comprise a generator or an alternator 12 associated with a rectification circuit that provides a direct current source, for example. The output of the alternator 12 is fed into a voltage regulator 14 that regulates the voltage potential that is provided to the electrical storage device 20 during operation of the internal combustion engine 10. The electrical storage device 20 may comprise batteries, dry cells, metal hydride batteries or the like.

The throttle actual may comprise a fuel injection component, a fuel injector, a fuel injector controller 22, an electro-mechanical valve, a solenoid associated with a carburetor or another mechanism. The throttle actuator 18 may be associated with an intake manifold or an intake port of the internal combustion engine 10. The throttle actuator 18 controls the flow rate of fuel (e.g., volume of fuel per unit time) to the internal combustion engine 10. Within an operational range of the internal combustion engine 10, the throttle actuator 18 controls the operational revolutions per unit time of an engine shaft of the internal combustion engine 10. The tachometer 16 comprises a sensor for measuring the operational revolutions per unit time of the engine shaft. The drive train sensor 26 comprises a sensor for providing a status signal as to whether the engine shaft is coupled or decoupled to the wheels of the vehicle for propulsion. The controller 22 receives the following inputs: an revolution per unit time reading from the tachometer 16 and a status signal from the drive train sensor 26.

The controller 22 may operate in accordance with various alternate and cumulative techniques. Under a first technique, the controller 22 accesses alternator data 24 (e.g., power curve data associated with the alternator 12) to determine whether at least a minimum threshold percentage of the maximum power output is produced by the alternator 12 at a corresponding operational revolution per unit time. If the output power by the alternator 12 is not equal to or greater than the minimum threshold percentage of the maximum power output of the alternator 12 and if the status signal indicates that the engine shaft is not coupled to the drive wheel or wheels, the controller 22 may send control data or a control signal to the throttle actuator 18 to feed a greater flow rate of fuel to the internal combustion engine 10. The drive wheels may not be coupled to the engine shaft because (a) a transmission of the drive train is in neutral or not in gear or (b) because the hybrid is in an electric propulsion mode driven by an electric drive motor. In particular, the controller 22 sends control data or a control signal such that the output power of the alternator 12 is equal to or greater than the minimum threshold percentage.

Under a second technique, the controller 22 accesses or determines a minimum operational revolutions per unit time of the internal combustion engine 10 that corresponds to a minimum threshold percentage (e.g., fifty percent) of maximum power output of the alternator 12. If the measured operational revolutions per unit time are less the minimum operational revolution per unit time and if the status signal indicates that the engine shaft is not coupled to the drive wheel or wheels, the controller 22 may send control data or a control signal to the throttle actuator 18 to feed a greater flow rate of fuel to the internal combustion engine 10. In particular, the controller 22 sends control data or a control signal such that the operational revolutions per unit time meet or exceed the minimum operational revolutions per unit time.

Figure 2:
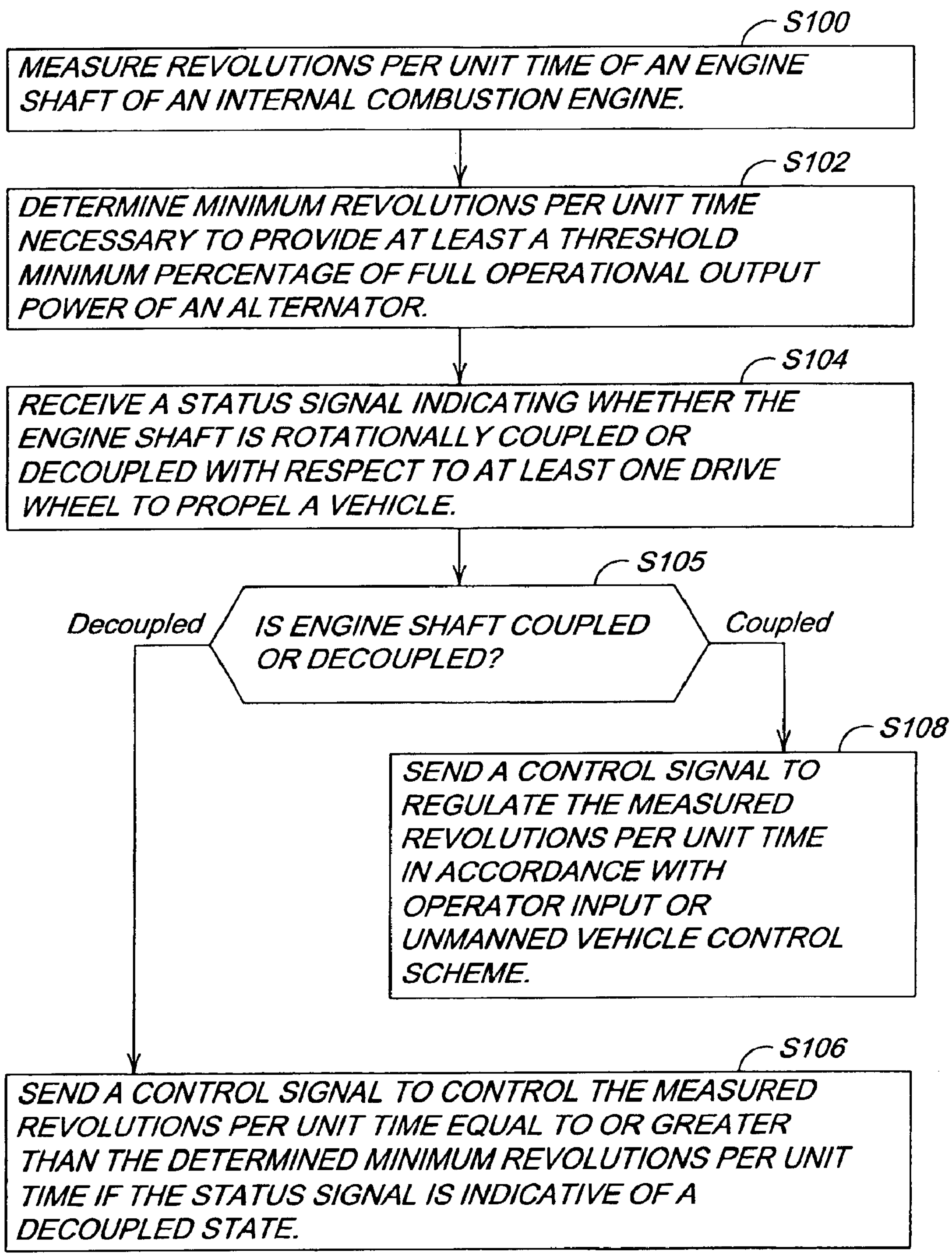
FIG. 2 is a flow chart of a method for managing the health of an electrical storage device of a vehicle in accordance with the invention.

FIG. 2 is a flow chart of a method for managing the storage of electrical energy in an electrical storage device 20 of a vehicle. The method of FIG. 2 begins in step S100.

In step S100, the tachometer 16 or an engine sensor measures revolutions per unit time of an engine shaft of an internal combustion engine 10. The engine shaft refers to a crankshaft, for example. The measured revolutions per unit time are communicated to a controller 22.

In step S102, a controller 22 determines the minimum revolutions per unit time necessary to provide at least a threshold minimum percentage of full operational output power of an alternator 12. Full output power means peak continuous rated alternator current or peak non-continuous rated alternator current at nominal system voltage (e.g., approximately 13.8 volts for a 12 volt system) on a warm (e.g., approximately 70 degrees Fahrenheit) day. Although a typical internal combustion engine 10 has an engine shaft speed of between approximately 1200 revolutions per minute (RPM) and approximately 2000 RPM for the alternator 12 associated with the engine to provide full output power, the actual engine shaft speed required to product full output power of the alternator 12 varies with the alternator output curve and operating constraints (e.g., fuel consumption, emission regulations or mechanical limitations) of the particular internal combustion engine 10. The actual output power of the alternator 12 generally depends upon the output curves of the alternator 12. The output curve may be expressed as power or amperage versus RPM of the alternator 12 shaft, for example.

The controller 22 could operate the engine 10 at whatever RPM necessary to maintain an adequate level of charge in the electrical storage device 20 (e.g., battery). In general, the voltage regulator 14 maintains a slightly higher charging voltage than the battery voltage and the controller 22 holds engine RPM at least 50% of peak amperage output or greater.

In step S104, the controller 22 receives a status signal indicating whether the engine shaft is rotationally coupled or decoupled with respect to at least one drive wheel or drive track to propel the vehicle. Coupled may mean that the engine shaft rotates synchronously or asynchronously through a gear train or transmission system with at least one drive wheel of the vehicle, during normal operation. For example, if a transmission is in the path of mechanical power transmission from the drive shaft to one or more wheels of the vehicle and if the transmission is in neutral or "out of gear", the engine shaft is considered decoupled or disengaged.

In step S105, the controller 22 determines whether the engine shaft is coupled or decoupled by reading the status signal. If the engine shaft is decoupled, the method continues in step S106. However, if the engine shaft is coupled, the method continues in step S108.

In step S106, the controller 22 sends a control signal to control the measured revolutions per unit time to be equal to or greater than the determined minimum revolutions per unit time if the status signal is indicative of a decoupled state between the engine shaft (e.g., crankshaft) and the a drive wheel or drive track. If the engine shaft (e.g., crankshaft) is not mechanically coupled for synchronous or asynchronous rotation with any of the drive wheels or drive tracks of the vehicle, an internal combustion engine 10 is generally operated at an engine speed (e.g., operational revolutions per unit time of the engine shaft) above idle to provide greater electrical power output to an electrical storage device 20 than the electrical power output provided at idle.

In one example for executing step S106, the controller 22 is programmed to raise the engine revolutions per unit time via the throttle actuator 18 to a level that allows the electrical system alternator 12 to provide approximately full power output to maintain the electrical batteries and to allow the engine cooling system to generate sufficient airflow to keep the engine temperature at a safe level. The engine cooling system may include (a) a fan for an air-cooled engine or (b) a fan, a water pump, a radiator, hoses, and a water jacket in an engine block for a water-cooled engine. The voltage regulator 14 on the alternator 12 may facilitate maintenance of electrical storage device 20 by keeping the voltage at a level (e.g., above a typical battery voltage) that will fully charge the electrical storage device 20 and keep it fully charged.

In one embodiment, when the vehicle is commanded to couple the engine shaft to at least one drive wheel, the engine revolutions per unit time are allowed to drop to a normal idle speed range, prior to engaging any gear or clutch involved, to minimize gear clash and uncontrolled vehicle motion.

In step S108, the controller 22 sends a control signal to regulate the measured revolutions per unit time in accordance with operator input or an unmanned vehicle control scheme. For example, operator input may refer to an operator that depresses an accelerator pedal or another throttle control mechanism to control the throttle of the vehicle. An unmanned vehicle control scheme may comprise a navigation system and software instructions for guiding a vehicle along a planned path without an operator. Part of the instructions for unmanned operation include throttle settings versus time or throttle settings versus position of the vehicle on the planned path, for example.

Figure 3:
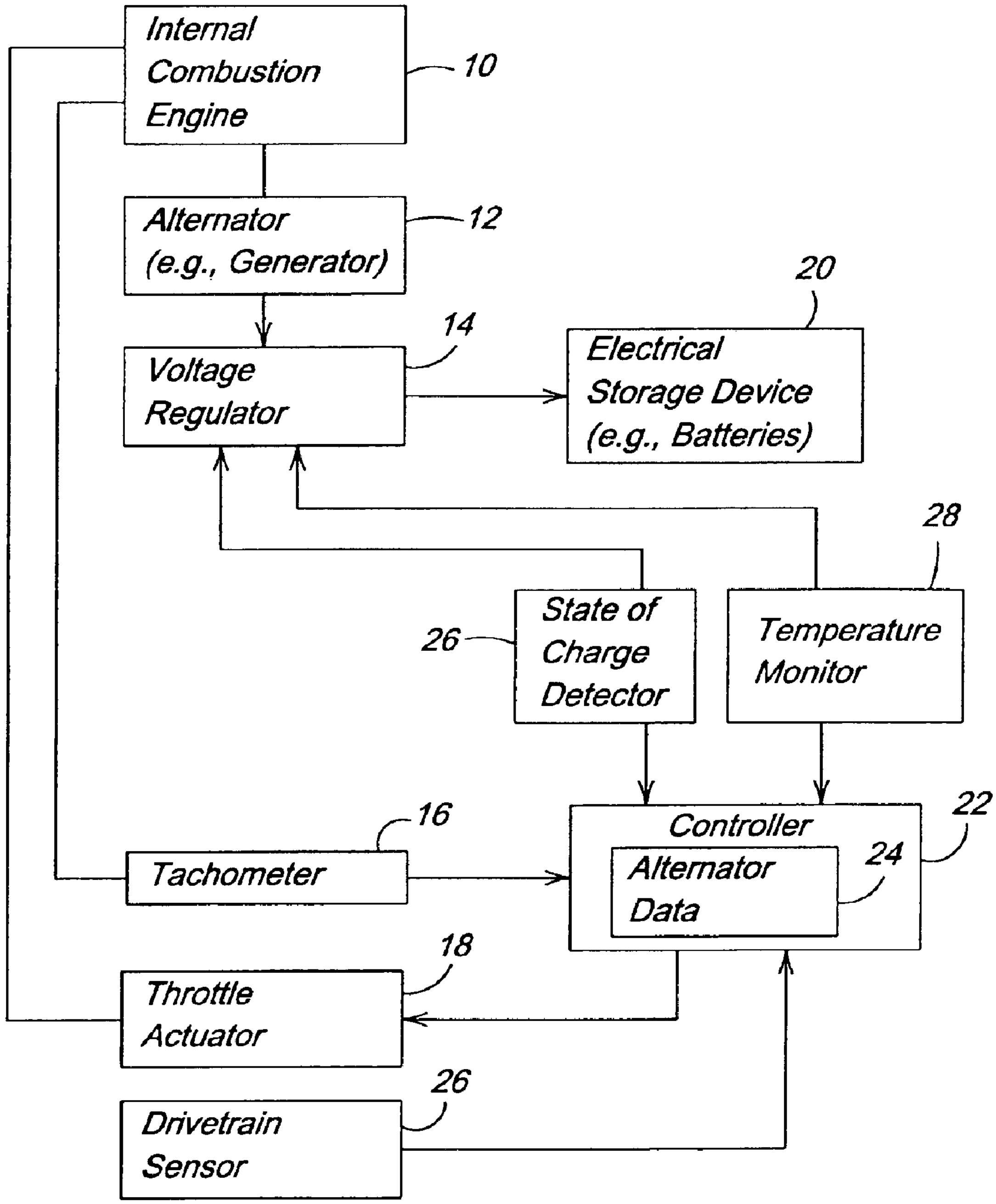
FIG. 3 is an alternate embodiment of a block diagram of a management system for managing the health of an electrical storage device of a vehicle.

The maintenance system of FIG. 3 is similar to the maintenance system of FIG. 1, except FIG. 3 further includes a state-of-charge detector 26 and a temperature monitor 28 coupled to the controller 22. Like reference numbers in FIG. 1 and FIG. 3 indicate like elements.

The state-of-charge detector 26 monitors the state of charge (SOC) of the electrical storage device 20 (e.g., batteries), and the temperature monitor 28 measures the temperature of the electrical storage device 20. The SOC represents the remaining capacity of a battery or electrical storage device in a charge/discharge cycle. SOC represents the ratio of the remaining capacity to the full charge capacity of a cycle-aged battery. In one embodiment, the SOC of the electrical storage device 20 may be estimated by measuring current drain and voltage levels at regular intervals. In another embodiment, the SOC may be based on a battery model that takes into account one or more of the following: charging voltage, charging time, charging temperature, discharge rate, discharge temperature, charge recovery, cycle aging, electrochemical composition factors, and an electrical equivalent circuit.

The state-of-charge data and the temperature data are inputted to the controller 22. The state-of-charge data may be time-stamped or associated with a temporal indicator. Similarly, the temperature data may be time-stamped or associated with a temporal indicator. The controller 22 may control the operational revolutions per unit time of the internal combustion engine 10 via the throttle actuator 18 to optimize charging of the electrical storage device 20 with respect to at least one of the voltage level per unit time and the current level per unit time applied to the electrical storage device 20. Further, the controller 22 may communicate with the voltage regulator 14 to regulate the voltage level per unit time provided to the electrical storage device 20.

The output of a battery is temperature dependent. On a normal warm day if the system voltage on a voltage bus drops below a sum of battery voltage plus an increment (e.g., drops below about 12.8 volts for a 12 volt battery), the battery will start to carry some of the load and will discharge or begin discharging. Accordingly, the voltage regulator 14 receives the state-of-charge data on the battery and actual temperature of the battery, and adjusts system voltage or voltage bus potential applied to the battery based on the state-of-charge data to facilitate reduced battery failure in the long term. For example, if the state-of-charge shows that the battery is fully charged, the battery may be permitted to discharge prior to raising the regulated voltage of the voltage bus to avoid overcharging the battery, which might damage the internal structure or continued chemical reactivity of the battery. However, if the state-of-charge shows that the battery has less than a certain portion of its full charge remaining, the voltage of the voltage bus may be raised to be at or above a minimum charging voltage which is equal to or greater than the sum of the battery voltage plus an increment. The increment may be based on the internal resistance of the battery, battery chemical composition, and battery design, among other factors.

The system and method of the invention allows better utilization of vehicle electrical power system including alternator 12 or other vehicle engine drive power generator. The system and method provides a means of maintaining electrical system health without adding vehicle mechanical complexity, weight, and expense. For example, the invention prevents failures that occur from discharging the batteries while idling.

Having described the preferred embodiment, it will become apparent that various modifications can be made without departing from the scope of the invention as defined in the accompanying claims.

What is claimed is:

1. A method for maintaining the health of an electrical storage device, the method comprising:

measuring revolutions per unit time of an engine shaft of an internal combustion engine;

determining minimum revolutions per unit time necessary to provide at least a threshold minimum percentage of full operational output power of an alternator;

receiving a status signal indicating whether the engine shaft is coupled or decoupled with at least one wheel or drive track; and sending a control signal to control the measured revolutions per unit time equal to or greater than the determined minimum revolutions per unit time if the status signal is indicative of decoupling.

2. The method according to claim 1 further comprising:

charging an electrical storage device with the alternator.

3. The method according to claim 1 wherein the threshold minimum percentage is greater than or equal to fifty percent of full operational output power of the alternator.

4. The method according to claim 1 wherein the threshold minimum percentage is equal to the approximately full operational output power of the alternator.

5. The method according to claim 1 wherein the minimum revolutions per unit time are within a range from approximately 1200 revolutions per minute to approximately 2000 revolutions per minute.

6. The method according to claim 1 wherein status signal indicates that the engine shaft is decoupled when at least one of the following conditions is present: (a) a transmission being placed in neutral and (b) a vehicle being under an electrical propulsion mode.

7. The method according to claim 1 further comprising:

detecting a state-of-charge information associated with the electrical storage device;

adjusting a voltage outputted by the alternator based on the detected state-of-charge information.

8. The method according to claim 1 further comprising:

detecting state-of-charge information associated with the electrical storage device;

detecting a temperature associated with the electrical storage device;

adjusting the voltage outputted by a voltage regulator based on the detected state-of-charge information and the detected temperature.

9. A system for maintaining the health of an electrical storage device, the system comprising:

a tachometer for measuring revolutions per unit time of an engine shaft of an internal combustion engine;

a drive train sensor for providing a status signal indicating whether the engine shaft is coupled or decoupled with respect to at least one wheel or drive track to propel a vehicle;

a controller for determining minimum revolutions per unit time necessary to provide at least a threshold minimum percentage of full operational output power of an alternator; a controller for sending a control signal to control the measured revolutions per unit time equal to or greater than the determined minimum revolutions per unit time if the status signal is indicative of disengagement; and a throttle actuator responsive to the control signal.

10. The system according to claim 9 further comprising:

an alternator for charging an electrical storage device.

11. The system according to claim 9 wherein the threshold minimum percentage is greater than or equal to fifty percent of full operational output power of the alternator.

12. The system according to claim 9 wherein the threshold minimum percentage is equal to the approximately full operational output power of the alternator.

13. The system according to claim 9 wherein the minimum revolutions per unit time are within a range from approximately 1200 revolutions per minute to approximately 2000 revolutions per minute.

14. The method according to claim 9 wherein status signal indicates that the engine shaft is decoupled when at least one of the following conditions is present: (a) a transmission being placed in neutral and (b) a vehicle being under an electrical propulsion mode.

15. The system according to claim 9 further comprising:

a state-of-charge device for providing a state-of-charge information associated with the electrical storage device; and a voltage regulator for adjusting an output voltage outputted by the alternator based on the detected state-of-charge information.

16. The system according to claim 9 further comprising:

a state-of-charge device for providing a state-of-charge information associated with the electrical storage device;

a temperature sensor for detecting a temperature associated with the electrical storage device; and adjusting the voltage outputted by the alternator based on the state-of-charge information and the detected temperature.

* * * * *